J. G. MICKLE & F. F. DEARRING.
Cotton-Chopper.

No. 160,937. Patented March 16, 1875.

Witnesses:
J. P. Theodore Lang,
S. K. Pettingale

Inventors
John G. Mickle
Fountain F Dearring
By James R Hensley
Attorney

UNITED STATES PATENT OFFICE.

JOHN G. MICKLE AND FOUNTAIN F. DEARRING, OF FOSTERVILLE, TENN.

IMPROVEMENT IN COTTON-CHOPPERS.

Specification forming part of Letters Patent No. 160,937, dated March 16, 1875; application filed August 15, 1874.

*To all whom it may concern:*

Be it known that we, JOHN G. MICKLE and FOUNTAIN F. DEARRING, both of Fosterville, Rutherford county, Tennessee, have jointly invented an Improvement in Cotton Choppers and Scrapers, of which the following is a specification:

The purpose of this invention is to construct an implement for thinning or chopping and scraping growing cotton.

Figure 1:
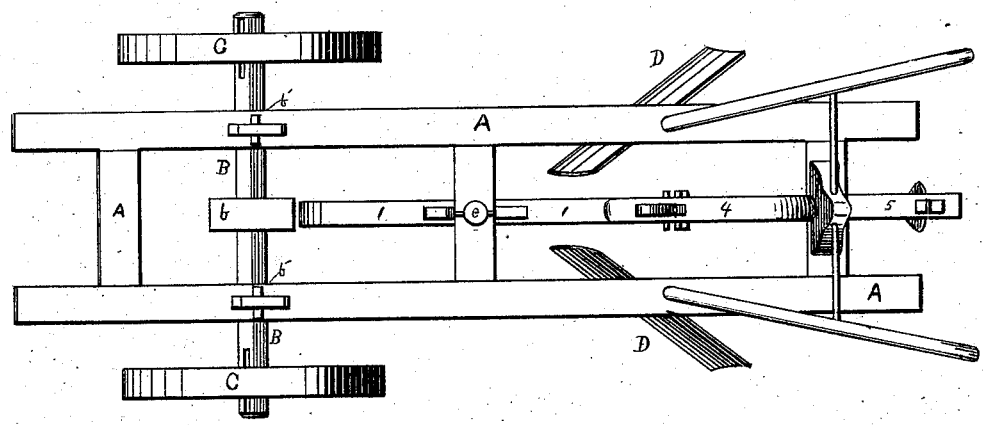
Figure 2:
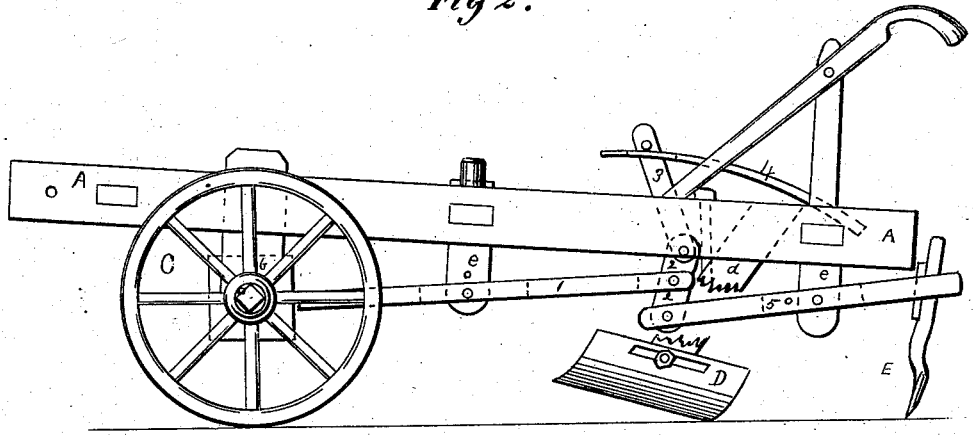

The plan view, Figure 1, shows but little of the different parts, they being fully exhibited in Fig. 2.

The frame A consists of two parallel pieces, connected by three equidistant cross-ties. Two bearing-stocks for the axles are mortised into the frame near the forward cross-tie, and the handles and the share-stocks are mortised into the frame near the rear cross-tie. The axle B is square, with the exception of its journals $b'\ b'$, and is grooved, so the wheels $c\ c$ can be keyed to it, and adjusted to different gages desired, according to the width of the cotton-rows, or their distance apart. The trip $b$ is square, and is slipped on the axle to the center and keyed, it being provided with a square box with groove, the same as the wheels $c\ c$, so as to revolve simultaneously with the axle. The shares D D are grooved longitudinally, so as to be adjusted as necessary, the stocks $d\ d$ being so cut and faced that when the shares are secured to the stocks by means of clamp-bolts passing through the groove in the share, and through the stock, the toes of the shares will be thrown higher than the heels, so as to conform to the incline of the ridge in which the cotton is growing.

The hoe or chopper E is operated by a combination of levers and a spring-bar, yet to be described.

The fulcrums $e\ e$ are mortised into, or attached to, the center of the middle and rear cross-ties. The trip-lever 1 is jointed to the forward fulcrum, near the middle of the lever, the forward end being free, and pointed at the axle. The other end is coupled with the link 2 in the center of the link, which is to stand nearly at right angles to the trip-lever 1. Its lower end will be jointed to the forward end of the hoe-lever 5. The top end will be coupled with the upright lever 3, which, in turn, connects with the spring-bar 4. This spring-bar, being for the purpose of elevating the central junctions, so that the tip of the trip-lever 1 will point as before described, is mortised into the rear tie. The hoe-lever 5 is, in its middle, jointed to the rear fulcrum $e$, and into the rear end is mortised the stock of the hoe E, which resembles in some degree a spade.

It will be seen that the spring-bar can be either an arch or half-arch. The levers and fulcrums could be coupled differently; but we have described our invention as illustrated in the accompanying drawing, the forward fulcrum being adjustable, as well as the hoe-lever, by means of holes, to either of which can be jointed the corresponding part, for the purpose of regulating the depth of chopping by the hoe. The distance of thinning, or the stand, as it is generally called, is regulated by the diameter of the wheels or the trip $b$.

Cotton is sown in drills on the top of long straight ridges. The first cultivation after the coming up of the plants is to thin out or chop the plants to a suitable stand or distance apart, and also to scrape all weeds and grass from the sides of the ridge near the plants. Different planters use ridges of different widths, and wish the plants to stand so thick as they think best, generally from ten to fourteen inches apart; hence our provision for adaptation.

The different parts must be so proportioned that when the wheels are astride the ridge, the hoe directly over the plants, and the horse is started, the axle, the wheel, and the trips revolve together. A corner of the trip $b$ strikes under the forward end of the trip-lever 1, and, elevating it, lowers the central junctions, and by that raises the rear end of the hoe-lever 5 (and with it the hoe E) above the plants. Revolving farther, that corner of the trip becomes so elevated that the trip-lever looses its hold, and slips back down into its former position, which it would not do were it not for the spring-bar 4. The hoe E, simultaneously with this, sets into the ground as deep as wished, and moves along, chopping out the plants until the trip-lever is struck by another corner of the trip, when the hoe jumps or skips a space, called the stand, in which the plants remain undisturbed. The shares are all this time scraping the sides of the ridge. When passing over ground where it is not wished to use the hoe—as in a lane—it can be thrown out of gear by disconnecting the upright lever 3 and the spring-bar 4; this entire implement being so entirely different from any others heretofore noticed by us.

We claim as our invention—

The combination, in a cotton chopper and scraper, of the hoe E, the levers 1 2 3 5, the spring-bar 4, and the trip $b$, all constructed and arranged substantially as described, for the purposes specified.

JOHN GEORGE MICKLE.
FOUNTAIN FARIS DEARRING.

Witnesses:
S. P. OAKLEY,
L. H. EDWARDS.